United States Patent
Watanabe et al.

(10) Patent No.: US 9,727,069 B2
(45) Date of Patent: Aug. 8, 2017

(54) POWER DEMAND ADJUSTMENT SYSTEM AND POWER DEMAND ADJUSTMENT METHOD

(75) Inventors: Tohru Watanabe, Tokyo (JP); Masato Utsumi, Tokyo (JP); Naohiro Yuasa, Tokyo (JP); Masao Tsuyuzaki, Tokyo (JP); Nobuhisa Kobayashi, Tokyo (JP); Masao Tada, Tokyo (JP); Yuuichi Ootake, Tokyo (JP); Chiemi Tsuchiya, Tokyo (JP)

(73) Assignee: HITACHI, LTD., Tokyo (JP)

(*) Notice: Subject to any disclaimer, the term of this patent is extended or adjusted under 35 U.S.C. 154(b) by 448 days.

(21) Appl. No.: 14/376,087

(22) PCT Filed: Feb. 2, 2012

(86) PCT No.: PCT/JP2012/052381
§ 371 (c)(1),
(2), (4) Date: Jul. 31, 2014

(87) PCT Pub. No.: WO2013/114601
PCT Pub. Date: Aug. 8, 2013

(65) Prior Publication Data
US 2014/0379154 A1   Dec. 25, 2014

(51) Int. Cl.
| G05B 11/01 | (2006.01) |
| G05D 3/12 | (2006.01) |
| G05F 1/66 | (2006.01) |
| G06Q 50/06 | (2012.01) |
| G06Q 10/04 | (2012.01) |

(52) U.S. Cl.
CPC .............. *G05F 1/66* (2013.01); *G06Q 10/04* (2013.01); *G06Q 50/06* (2013.01)

(58) Field of Classification Search
None
See application file for complete search history.

(56) References Cited

U.S. PATENT DOCUMENTS

| 8,612,062 B2 | 12/2013 | Iino et al. | |
| 8,966,290 B2* | 2/2015 | Miki | G06F 1/266 700/291 |
| 2001/0025209 A1* | 9/2001 | Fukui | G06Q 50/06 700/291 |

(Continued)

FOREIGN PATENT DOCUMENTS

| JP | 2002-010500 A | 1/2002 |
| JP | 2002-252924 A | 6/2002 |

(Continued)

OTHER PUBLICATIONS

Osborne, et al., A Primer on Demand Response, The Power Grid: Evolving from a "Dumb" Network to a "Smart" Grid, A White Paper on a Facet of the Industrial Growth Sector, Oct. 16, 2007, 5-47.

*Primary Examiner* — Adam Lee
(74) *Attorney, Agent, or Firm* — Volpe and Koenig, P.C.

(57) ABSTRACT

A power demand adjustment system and method that controls a plurality of sub-aggregators and electrical devices in a customer's facility based on information collected by the power company and the sub-aggregators. The method and system includes a comparison of the power company and sub-aggregator data which enables accurate accounting and control of the customer's electrical devices.

6 Claims, 10 Drawing Sheets

(56) References Cited

U.S. PATENT DOCUMENTS

| | | | | |
|---|---|---|---|---|
| 2008/0172279 A1* | 7/2008 | Enis | ............ | F03D 9/005 |
| | | | | 705/7.25 |
| 2010/0005321 A1* | 1/2010 | Miki | ............ | G06F 1/266 |
| | | | | 713/300 |
| 2010/0314942 A1 | 12/2010 | Talkin et al. | | |
| 2010/0332275 A1* | 12/2010 | Walsh | ............ | G06Q 10/06 |
| | | | | 705/7.37 |

FOREIGN PATENT DOCUMENTS

| | | |
|---|---|---|
| JP | 2002-345177 A | 11/2002 |
| JP | 2004-234531 A | 8/2004 |
| JP | 2010-119269 A | 5/2010 |
| JP | 2011-055939 A | 3/2011 |

* cited by examiner

Fig. 6

| Electrical equipment | Power-saving type | Power-savings unit price |
|---|---|---|
| 430a | Air conditioning (controllable) | 10 yen/hour |
| 430c | Lighting (not controllable) | 3 yen/hour |

Fig. 7

| Electrical equipment | Power-saving type | Power-saving unit price |
|---|---|---|
| 430b | Air conditioning (controllable) | 10 yen/hour |

POWER DEMAND ADJUSTMENT SYSTEM AND POWER DEMAND ADJUSTMENT METHOD

TECHNICAL FIELD

The present invention relates to a power demand adjustment system and a power demand adjustment method.

BACKGROUND ART

In order to curb peak power demand, time period-based electricity billing plans, demand response (DR), and other such demand adjustment methods are known. As specific methods for adjusting demand, a technique in which a power company (electric utility) requests that power customers curb power consumption and pays customers an incentive (also called a reward or a rebate) relative to the amount of power saved, and a technique in which power supply and demand are adjusted by controlling a distributed generation system so as to resolve the difference between the aggregate power demand and the aggregate power supply, are known (for example, Patent Literature 1, 2).

In demand response, a power company contracts with the customer to save power before a tight power supply situation occurs. In this contract, the power company proposes to the customer a requested amount of power savings and offers a rate discount when the request is agreed to. The power company also checks whether or not the customer implemented power savings in accordance with the contract by measuring the customer's usage after power has become tight.

CITATION LIST

Patent Literature

[PTL 1]
Japanese Patent Application Laid-open No. 2002-252924
[PTL 2]
Japanese Patent Application Laid-open No. 2002-010500

SUMMARY OF INVENTION

Technical Problem

A power company contracts with a customer for the use of electrical energy, and, in addition, when demand response is being implemented, the power company enters into a power-saving contract with the customer. Regarding this power-saving contract, the power company may enter into a power-saving contract with a customer's agent (also called an aggregator), and, in addition, the agent may conclude power-saving contracts with a plurality of customers.

In accordance therewith, the power company can measure the amount of power saved by each customer subsequent to a power savings procedure, but cannot measure the amount of power saved by the agent. This makes it impossible to check whether or not the agent implemented power savings in accordance with the contract. Thus, cases can occur in which the agent obtains incentives fraudulently by contracting for a different amount of power savings than the amount of power savings capable of being implemented.

An object of the present invention is to provide a technique for calculating the results of the amount of adjustment pertaining to the agent (the amount of power savings achieved in accordance with the actions of the agent) relative to an adjustment to power usage by a customer belonging to the agent.

Solution to the Problem

To resolve the aforementioned problems, one aspect of the present invention is a power demand adjustment system for adjusting power demand of a customer who concludes a power use contract via an agent, this power demand adjustment system including: an acquisition unit that acquires facility information indicating a customer facility for power use, and result information indicating a result of the power use of the customer; and a calculation unit that calculates, on the basis of the acquired facility information and the acquired result information, an actual adjustment amount, which is the result of power demand adjustment pertaining to the agent.

BRIEF DESCRIPTION OF DRAWINGS

FIG. 6 shows incentive information for Sa.
FIG. 7 shows incentive information for Sb.

DESCRIPTION OF EMBODIMENTS

Examples of the present invention will be explained below on the basis of the drawings.

A power supply-and-demand system to which the power demand adjustment system of the present invention has been applied will be explained here.

First, the configuration of the power supply-and-demand system will be explained.

Figure 1:
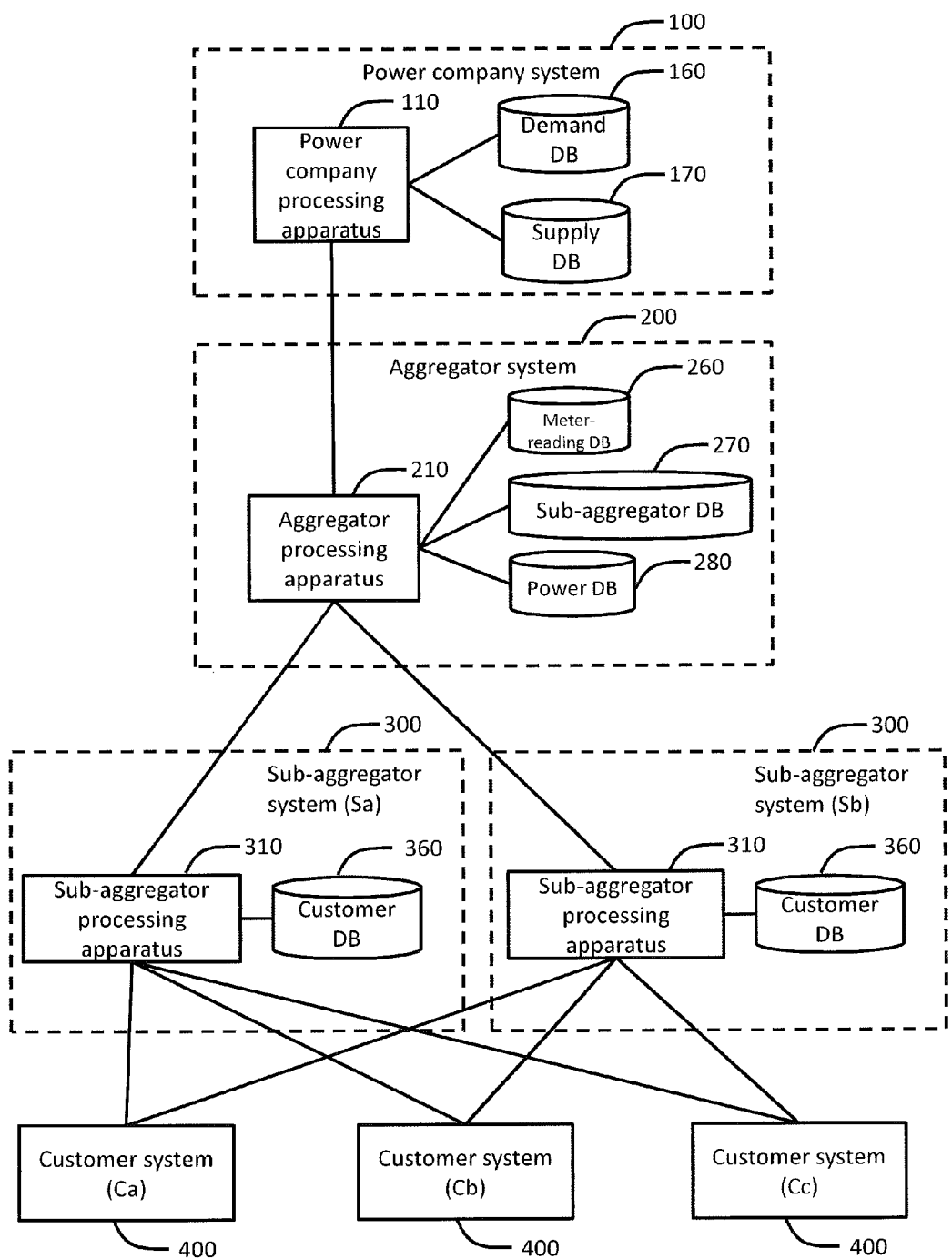
FIG. 1 shows the configuration of information processing facilities of a power supply-and-demand system.

FIG. 1 shows the configuration of information processing facilities of a power supply-and-demand system. The technical scope of the present invention is not limited to the configuration shown in FIG. 1 and the respective drawings subsequent to FIG. 1. All conceivable applications corresponding to the idea of the present invention are included in the technical scope of the present invention. A configuration that eliminates a number of components from among the components shown in FIG. 1 is also included in the technical scope of the present invention. A configuration that adds another component to the configuration shown in FIG. 1 is also included in the technical scope of the present invention.

The information processing facilities of the power supply-and-demand system include a power company system 100, an aggregator system 200, a plurality of sub-aggregator systems 300, and a plurality of customer systems 400. The power company system 100 is managed by a power company. The aggregator system 200 is managed by an aggregator. The two sub-aggregator systems 300 in this example are respectively managed by two sub-aggregators, Sa and Sb will be used as sub-aggregator identifiers for indicating these two sub-aggregators. The three customer systems 400 in this example are respectively managed by three customers. Ca, Cb and Cc will be used as customer identifiers for indicating these three customers. In this example, the number of the sub-aggregator systems 300 connected to the aggregator system 200 and the number of customer systems 400 connected to a single sub-aggregator system 300 are not limited. Also, in this example, it is assumed that two layers of agents formed by the aggregator and the sub-aggregators exist, but three or more layers of agents may exist.

A customer concludes a power-supply contract and a power-saving contract with the power company. In accordance therewith, the customer receives from the power company an incentive corresponding to the amount of power saved. The incentive may be received as a discount on the electricity charges, or may be received as a rebate payment for the power saved. At the same time, the customer concludes power-saving service contracts with a number of sub-aggregators. In accordance therewith, the customer pays the sub-aggregators a power-saving service fee corresponding to the amount of power saved. A customer may also contract with a single sub-aggregator. Furthermore, one sub-aggregator may contract with a single customer.

The sub-aggregator concludes a power-saving management contract with the aggregator. In accordance therewith, the sub-aggregator receives from the aggregator an incentive corresponding to the amount of power saved by the customer being managed.

The aggregator concludes a power-saving management contract with the power company. In accordance therewith, the aggregator receives from the power company an incentive corresponding to the amount of power saved by the customer being managed.

The power saving-related incentive may include an incentive for power-saving management, and may be such that the total amount is paid to the customer by the power company. A customer and a sub-aggregator may conclude a contract for services related to controlling the amount of power consumed, and the customer may pay the sub-aggregator a power-saving service fee. The sub-aggregator may pay the aggregator a power-saving service fee related to controlling the amount of power consumed.

The power saving-related incentive may be paid to the aggregator. An incentive is paid to the sub-aggregator by the aggregator at this time in accordance with the amount of power saved by the sub-aggregator that is being managed by the aggregator, and an incentive may be paid to the customer by the sub-aggregator in accordance with the amount of power saved.

In addition, the power saving-related incentive may be paid by the sub-aggregator. A service fee related to power-saving management is paid to the aggregator by the sub-aggregator at this time, and an incentive corresponding to the amount of power saved is paid to the customer by the sub-aggregator.

In this example, the amount of power saved by the customer indicates an amount obtained by subtracting the power usage of the customer's electrical equipment at a prescribed time point of a power-saving time period from the power usage of the customer's electrical equipment at a prescribed time point in the past. As used here, power usage may be consumption power, may be power consumption, or may be power consumption for a prescribed length of time. The prescribed length of time, for example, is 30 minutes.

The customer system 400 communicates with the sub-aggregator system 300 of a partner to a contract via a communication network. The sub-aggregator system 300 communicates with the aggregator system 200 via a communication network. The aggregator system 200 communicates with the power company system 100 via a communication network.

The power company system 100 includes a power company processing apparatus 110, a demand database 160, and a supply database 170. A database will be called a DB hereinafter. The power company processing apparatus 110 acquires meter-reading data from the customer system 400, and stores information obtained from the meter-reading data in the demand DB 160. The power company processing apparatus 110 computes an aggregator rebate and/or incentive on the basis of the demand DB 160. The power company processing apparatus 110 also acquires information indicating the operational status of a power generation facility 510, and stores this information in the supply DB 170. The power company processing apparatus 110 also predicts when power will become tight on the basis of the demand DB 160 and the supply DB 170, and sends tight-power information indicating that the power will become tight to the aggregator system 200.

The demand DB 160 and the supply DB 170 may be disposed inside the power company processing apparatus 110.

The aggregator system 200 includes an aggregator processing apparatus 210, a meter-reading DB 260, a sub-aggregator DB 270, and a power DB 280. The aggregator processing apparatus 210 acquires information in the demand DB 160 from the power company processing apparatus 110, and prepares the meter-reading DB 260. The aggregator processing apparatus 210 also stores contract information for each sub-aggregator in the sub-aggregator DB 270. The aggregator processing apparatus 210 also acquires information related to power savings from the power company processing apparatus 110, and stores this information in the power DB 280. The aggregator processing apparatus 210 also acquires information related to the power supply from the power company processing apparatus 110, and stores this information in the power DB 280.

The meter-reading DB 260, the sub-aggregator DB 270, and the power DB 280 may be disposed in the aggregator processing apparatus 210.

The power company processing apparatus 110 may include the functions of the aggregator processing apparatus 210.

The sub-aggregator system 300 includes a sub-aggregator processing apparatus 310 and a customer DB 360. The sub-aggregator processing apparatus 310 stores information regarding the contract with each customer in the customer DB 360. The sub-aggregator processing apparatus 310 controls a connected building controller (BC).

The customer DB 360 may be disposed in the sub-aggregator processing apparatus 310.

Figure 2:
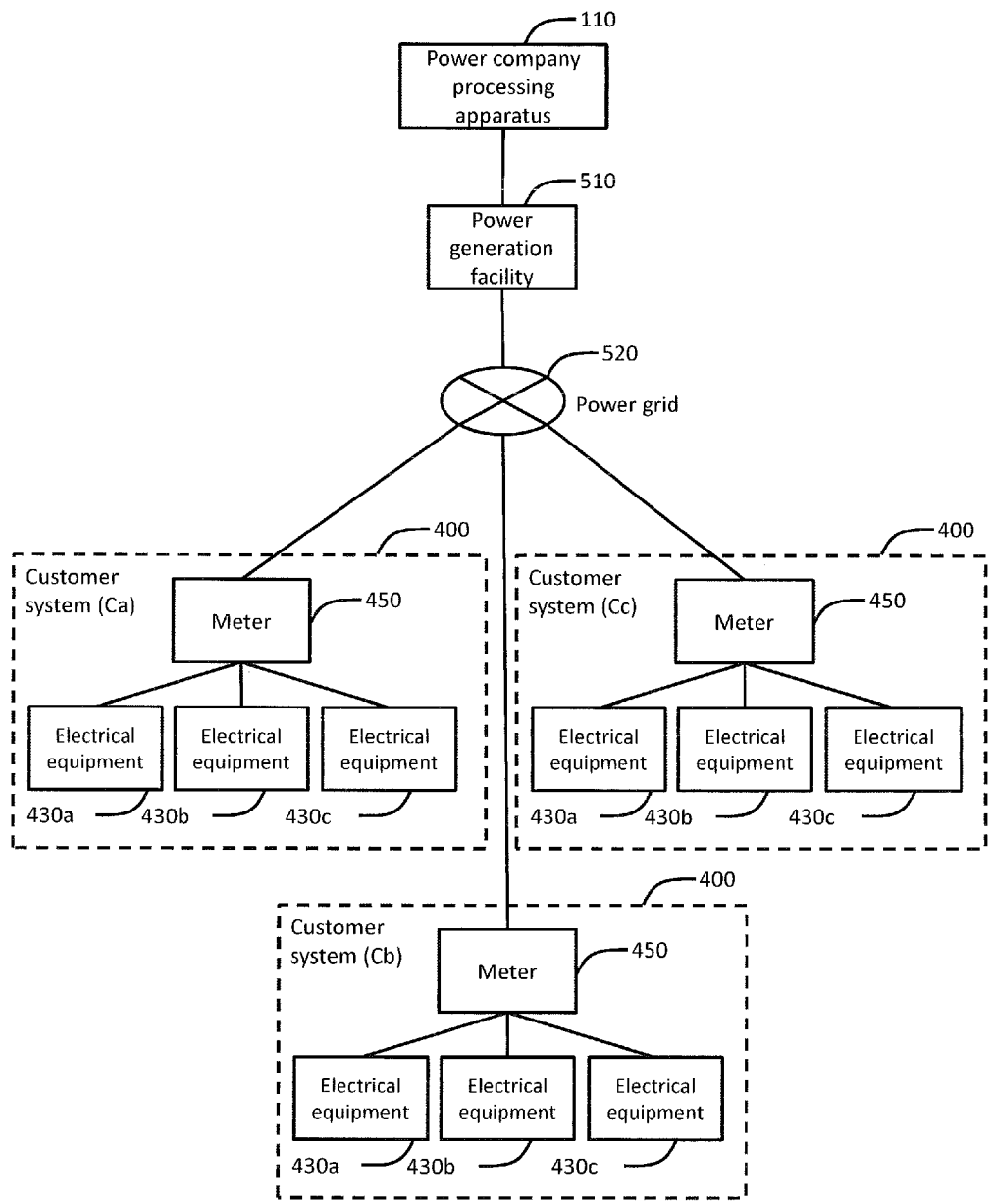
FIG. 2 shows the configuration of electric power facilities of the power supply-and-demand system.

FIG. 2 shows the configuration of the power facilities of the power supply-and-demand system. The power supply-and-demand system power facilities include the power company processing apparatus 110, the power generation facility 510, a power grid 520, and a customer system 400. The power generation facility 510 is controlled by the power company processing apparatus 110 and generates electric power. The customer system 400 is supplied with power from the power generation facility 510 via the power grid 520. The customer system 400 includes a meter 450, electrical equipment 430a, electrical equipment 430b, and electrical equipment 430c. The electrical equipment 430a, 430b, and 430c are loads that operate by being supplied with power from the power generation facility 510 via the power grid 520 and the meter 450.

Next, the information processing facilities of the customer system 400 will be explained in detail.

Figure 3:
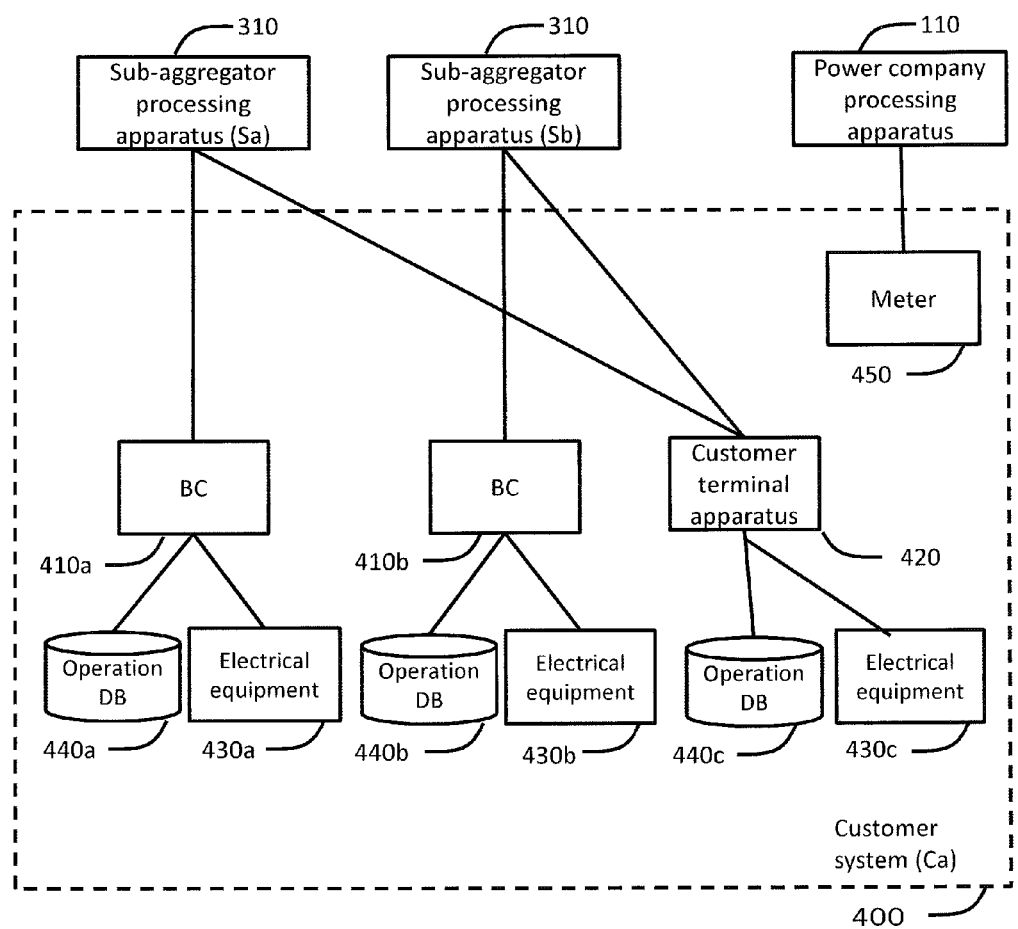
FIG. 3 shows the configuration of information processing facilities of a customer system.

FIG. 3 shows the configuration of information processing facilities of a customer system 400. The customer system 400 is disposed in a customer facility. In this example, the customer facility is a building. The customer system 400 includes a meter 450, a building controller (BC) 410a, a BC 410b, a customer terminal apparatus 420, electrical equipment 430a, electrical equipment 430b, and electrical equipment 430c, an operation DB 440a, an operation DB 440b, and an operation DB 440c.

The BC 410a is controlled by receiving a command from the Sa sub-aggregator processing apparatus 310 via the communication network. The BC 410b is controlled by receiving a command from the Sb sub-aggregator processing apparatus 310 via the communication network. In other words, the BCs 410a and 410b correspond to Sa and Sb, respectively.

The electrical equipment 430a is included in the contract with Sa, and is remotely controlled via the BC 410a by the Sa sub-aggregator processing apparatus 310. The electrical equipment 430b is included in the contract with Sb, and is remotely controlled via the BC 410b by the Sb sub-aggregator processing apparatus 310. In other words, the electrical equipment 430a and 430b correspond to the BCs 410a and 410b, respectively. The electrical equipment 430c is included in the contract with Sa, and is controlled manually. In this arrangement, the customer saves power by controlling the electrical equipment 430c on the basis of information notified to the customer terminal apparatus 420 from the sub-aggregator processing apparatus 310.

BC 410a and BC 410b may be a single apparatus, or may be more numerous apparatuses.

The electrical equipment 430a and 430b, for example, are air-conditioning equipment such as an air conditioner that is not capable of being controlled by the BC. Also, the electrical equipment 430c, for example, is lighting equipment that is not capable of being controlled by the BC. The electrical equipment 430a, 430b, and 430c may be other electrical equipment, such as an elevator, and this other electrical equipment may be either controllable or uncontrollable using the BC. The quantity and types of electrical equipment 430a, 430b, and 430c in each customer system 400, and the assignment relationships between the sub-aggregators and the electrical equipment 430a, 430b and 430c is not limited in this example.

The BC 410a records in the operation DB 440a an operation log indicating the operational status of the electrical equipment 430a, which is targeted for control. Similarly, the BC 410b records in the operation DB 440b an operation log indicating the operational status of the electrical equipment 430b, which is targeted for control. The customer terminal apparatus 420 records in the operation DB 440c an operation log indicating the operational status of the electrical equipment 430c inputted by the customer. The operational status, for example, may be information indicating the operating period, temperature settings, and power consumption, or consumption power, or power consumption over a prescribed length of time of the electrical equipment. The prescribed length of time, for example, is 30 minutes.

The meter 450 acquires meter-reading data by measuring the power usage of the customer system 400 at prescribed measurement time intervals, and sends the meter-reading data to the power company processing apparatus 110 via a communication network for meter reading use. The measurement time interval, for example, is 30 minutes. In accordance therewith, the meter-reading data is stored in the demand DB 160 at each measurement time for each customer. The meter-reading data may be the power usage during the measurement time interval, or may be the maximum power usage during the measurement time interval.

Figure 4:
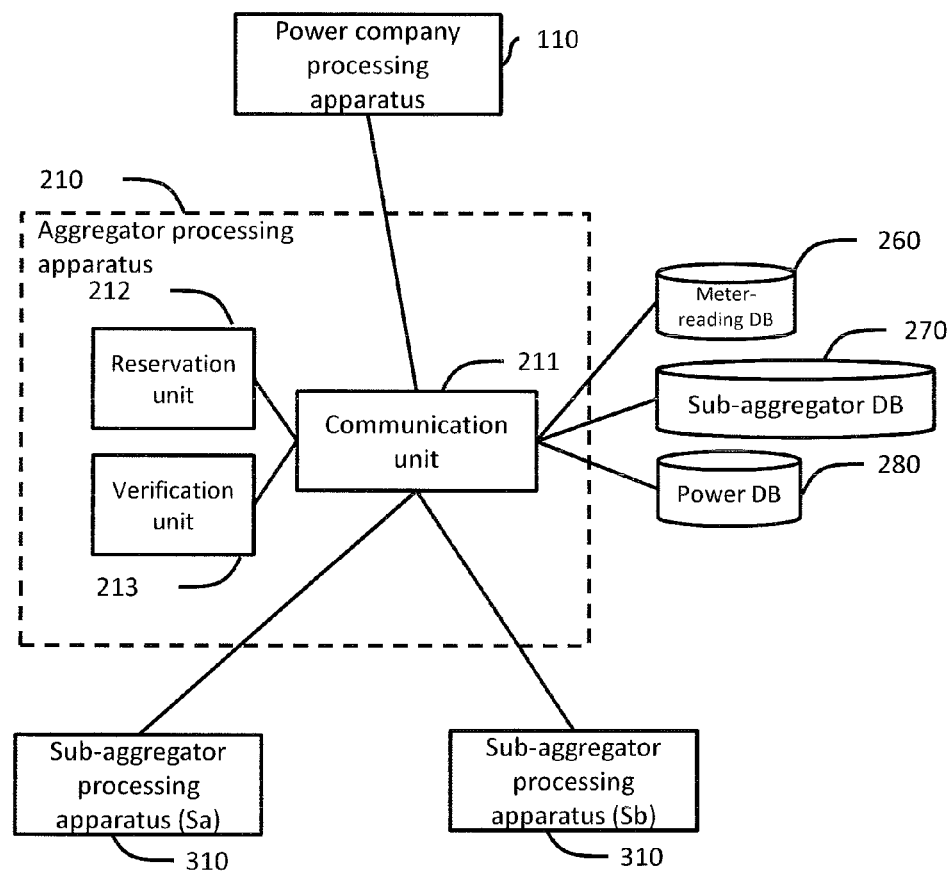
FIG. 4 shows the configuration of an aggregator processing apparatus.

FIG. 4 shows the configuration of the aggregator processing apparatus 210. The aggregator processing apparatus 210 includes a communication unit 211, a reservation unit 212, and a verification unit 213. The reservation unit 212 and the verification unit 213 communicate with the power company processing apparatus 110 and the sub-aggregator processing apparatus 310 via the communication unit 211. The reservation unit 212 and the verification unit 213 also acquire and store information by communicating with the meter-reading DB 260, the sub-aggregator DB 270, and the power DB 280 via the communication unit 211. The reservation unit 212 performs processing related to reserving power savings with the sub-aggregator processing apparatus 310. The verification unit 213 performs processing related to verifying power savings with the sub-aggregator processing apparatus 310.

Next, a power-saving preparation process, which is preparations for saving power by the power supply system, will be explained.

Figure 5:
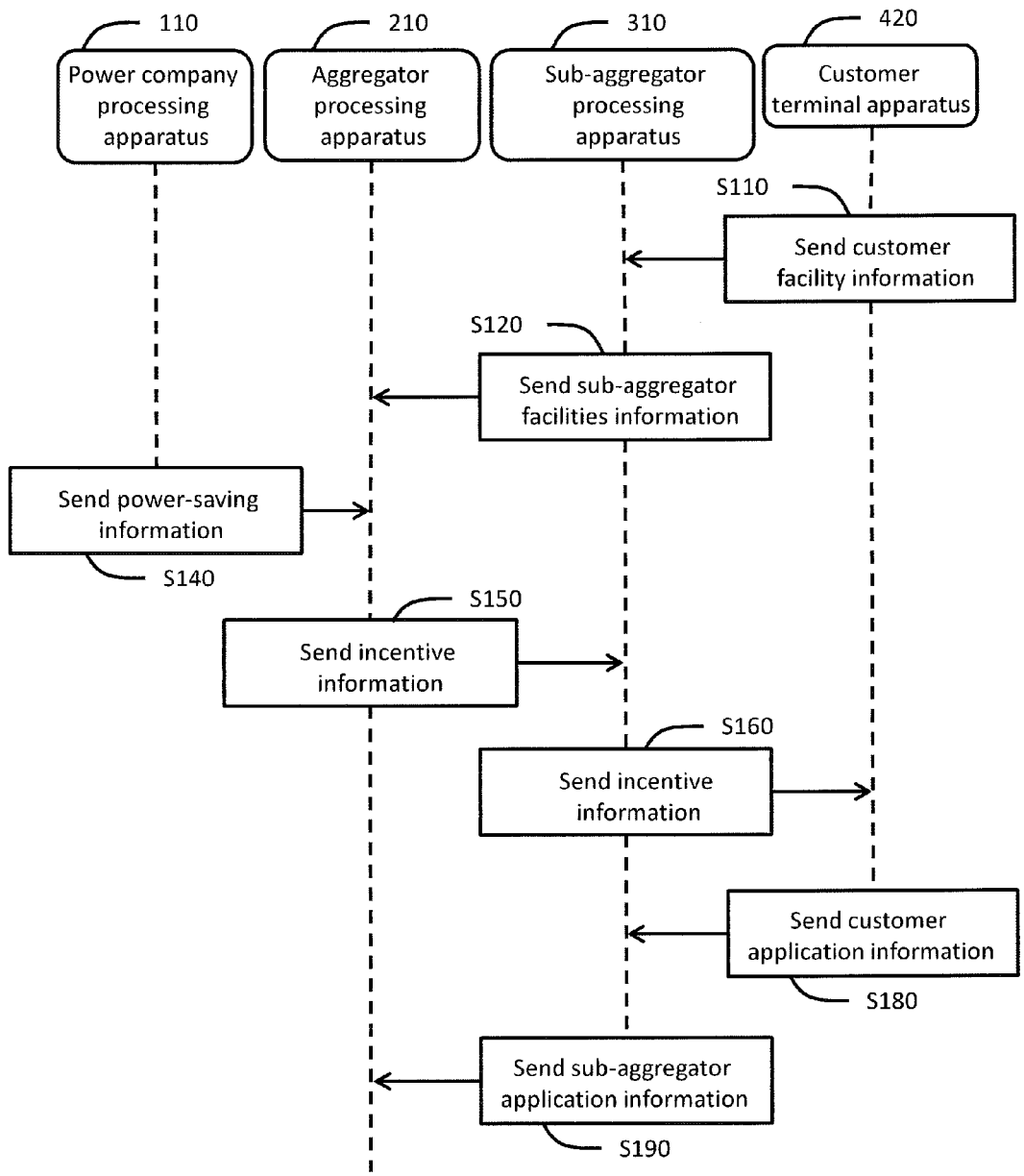
FIG. 5 shows a power-saving preparation process.

FIG. 5 shows a power-saving preparation process. This drawing is a sequence chart showing the operations of the power company processing apparatus 110, the aggregator processing apparatus 210, the sub-aggregator processing apparatus 310, and the customer terminal apparatus 420. When a contract has been concluded between a sub-aggregator and a customer, the customer terminal apparatus 420 sends customer facility information, which is information indicating the customer facility, to the sub-aggregator processing apparatus 310 (S110). In accordance therewith, the sub-aggregator processing apparatus 310 acquires the customer facility information and registers this information in the customer DB 360. The customer facility information includes a total floor area of the customer facility of the target customer, and a demand under contract that has been determined on the basis of the maximum power demand of the customer facility. The customer facility information may include the volume of an indoor space of the customer facility. The customer facility information may include the quantity and type of electrical equipment inside the customer facility. Also, instead of the type of electrical equipment, the customer facility information may include the performance and efficiency of the electrical equipment. The sub-aggregator processing apparatus 310 may acquire the customer facility information inputted by the sub-aggregator, and may register this information in the customer DB 360.

When a contract has been concluded between the aggregator, a sub-aggregator, and a customer, the sub-aggregator processing apparatus 310 acquires from the customer DB 360 the customer facility information of all the customers that have contracts with the sub-aggregator, and sends this information to the aggregator processing apparatus 210 as sub-aggregator facilities information (S120). In accordance therewith, the aggregator processing apparatus 210 acquires the sub-aggregator facilities information, and registers this information in the sub-aggregator DB 270 (S120).

Next, the power company processing apparatus 110 notifies the aggregator processing apparatus 210 of power-saving information indicating the relationship among the power-saving time period, the amount of power saved, and the incentive (S140).

At this point, the power company processing apparatus 110, on the basis of the demand DB 160 and the supply DB 170, predicts an aggregate supply and an aggregate demand for power based on past data, and predicts a tightening of power when the difference between the aggregate supply and the aggregate demand becomes equal to or less than a prescribed threshold. The power company processing apparatus 110, for example, makes the predictions here on the basis of data on a tight power supply situation that occurred in the past under a similar condition. The similar condition, for example, is the same time of the same season every year. Also, the power company processing apparatus 110 regards the time period during which a tight power supply situation occurs as the power-saving period, regards the time at which the difference between the aggregate supply and the aggregate demand is the smallest as the tight-power time, and regards the power usage necessary to reduce power consumption at tight-power time as the power-saving amount.

The aggregator processing apparatus 210 sends the sub-aggregator processing apparatus 310 incentive information indicating the incentive for saving power during the power-saving period (S150). The sub-aggregator processing apparatus 310 that receives this information displays the incentive information. The sub-aggregator processing apparatus 310 sends the power-saving time period and the incentive information to the customer terminal apparatus 420 (S160). Upon receiving this information, the customer terminal apparatus 420 displays the incentive information.

At this point, the aggregator processing apparatus 210 creates incentive information and stores the information in the sub-aggregator DB 270. The incentive information, for example, includes a power-saving type indicating the type of electrical equipment, and a power-saving unit price indicating the incentive per unit of time relative to the power savings by the electrical equipment. The unit of time, for example, is one hour.

FIG. 6 shows incentive information for Sa. In this instance, of the electrical equipment that is subject to Sa, the power-saving unit price of the electrical equipment 430a, which is air-conditioning equipment capable of being controlled by the Sa, is 10 yen/hour per kW, and the power-saving unit price of the electrical equipment 430c, which is lighting equipment not capable of being controlled by the Sa, is 3 yen/hour per kW. FIG. 7 shows incentive information for Sb. In this instance, the power-saving unit price of the electrical equipment 430b, which is electrical equipment that is subject to Sb, that is, air-conditioning equipment capable of being controlled by Sb, is 10 yen/hour per kW. In this case, the aggregator processing apparatus 210 determines the power-saving unit price for each power-saving type. The power-saving type is associated beforehand with information indicating the performance and efficiency of the corresponding electrical equipment. In determining the power-saving unit price, a physical simulation of the corresponding electrical equipment may be used, information indicating the performance and efficiency of the electrical equipment may be used, and meteorological conditions may be used.

The power-saving unit price need not be a fixed value such as 10 yen/hour per kW, but rather can be expressed using a function such as Fc(i,W). As used here, i is the quantity of electrical equipment, W is the amount of power saved [kW], and Fc(i,W) is the amount of the incentive to be provided for saving W[kW] of power per hour. Fc(i,W) may be written as Fc(i) for the sake of simplification. From a synthesis of function, the function Fc(s), which expresses the total amount of the incentive for the power saved with the sub-aggregator-controlled equipment, is provided. The s is a variable representing the sub-aggregator.

The customer terminal apparatus 420 applies for a power-saving reservation with respect to the power-saving time period and the incentive information by sending sub-aggregator customer application information indicating the nature of the power savings capable of being implemented by the customer during the power-saving time period (S180). The customer application information indicates the customer identifier, the amount of power savings applied for by the customer, which is the amount of power savings capable of being implemented by the customer in the power-saving time period, and a power-saving type indicating the type of electrical equipment to be controlled for saving the power. The sub-aggregator processing apparatus 310 stores the customer application information from the customer terminal apparatus 420 in the customer DB 360.

The sub-aggregator processing apparatus 310 applies for a power-saving reservation by creating sub-aggregator application information with respect to the power-saving time period and the incentive information on the basis of the customer application information in the customer DB 360, and sending the sub-aggregator application information to the aggregator processing apparatus 210 (S190). The sub-aggregator application information includes a sub-aggregator identifier, and, from among the customer application information of the customers belonging to the sub-aggregator, the nature of the power savings by the electrical equipment belonging to the customer. The aggregator processing apparatus 210 stores the sub-aggregator application information from the sub-aggregator processing apparatus 310 in the sub-aggregator DB 270.

The preceding is the flow of the power-saving preparation process.

In this example, the amount of power saved by the customer indicates an amount obtained by subtracting the power usage of the customer's electrical equipment at a prescribed time point of a power-saving time period from the power usage of the customer's electrical equipment at a prescribed time point in the past. The amount of power saved by the sub-aggregator indicates the total of the amounts of power saved by all the electrical equipment subject to the sub-aggregator. Another aspect of this example may be one in which a value obtained by subtracting the power usage from a contracted prescribed amount of power (contract demand [kW] and contract amperes) is regarded as the amount of power saved.

Next, a power-saving process, which is processing by the power supply-and-demand system before and after the power-saving time period, will be explained.

The power company processing apparatus 110 sends the aggregator processing apparatus 210 an aggregator power-saving request in order to request that the aggregator save power in response to a predicted tight power supply situation. At this point, the power company processing apparatus 110, on the basis of the demand DB 160 and the supply DB 170, determines a power-saving time period, which is the time period during which power savings is requested, a tight-power time, which is a time within the power-saving time period when the power supply will become the tightest, and an aggregator requested power-saving amount, which is the amount of power savings requested of the aggregator. The aggregator power-saving request includes the power-saving time period, the tight-power time, and the amount of power savings requested of the aggregator. The tight-power time is the time when the difference between the aggregate supply and the aggregate demand is predicted to be the smallest. The power-saving time period includes the tight-power time, and is the time period during which a tight power supply situation will occur.

Figure 8:
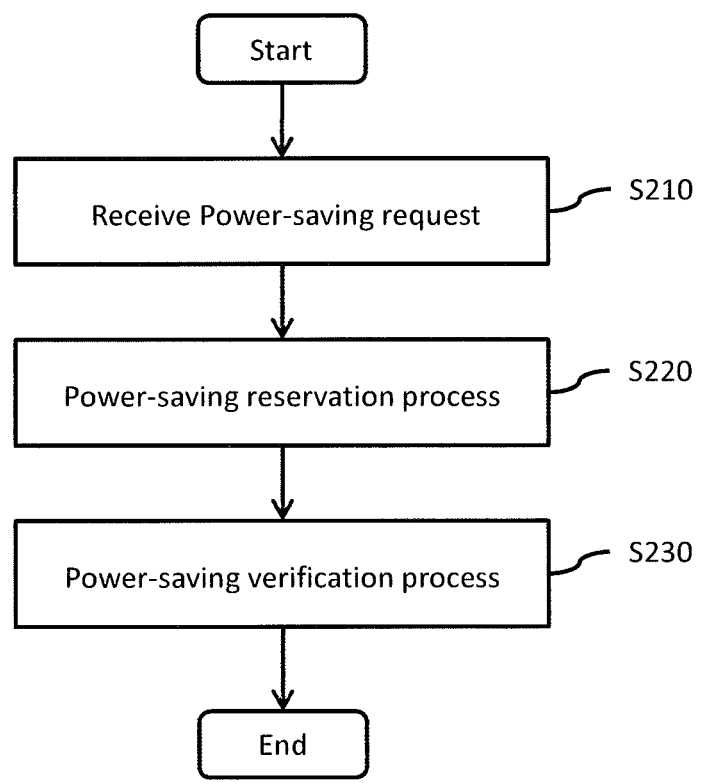
FIG. 8 describes the operations of the aggregator processing apparatus in a power-saving process.

FIG. 8 describes the operations of the aggregator processing apparatus 210 in a power-saving process. First, the aggregator processing apparatus 210 receives an aggregator power-saving request from the power company processing apparatus 110 (S210). Next, the aggregator processing apparatus 210, based on the aggregator power-saving request and taking into account the amount of power savings capable of being implemented by each sub-aggregator, performs a power-saving reservation process for determining an amount of reserved power savings for each sub-aggregator and indicating this amount to the sub-aggregator processing apparatus 310 (S220).

Next, after the power-saving time period, the aggregator processing apparatus 210 performs a power-saving verification process for verifying the result of the power savings by each sub-aggregator (S230), and ends the flow.

The preceding is the flow of the power-saving process.

Next, the power-saving reservation process indicated in S220 will be explained.

Figure 9:
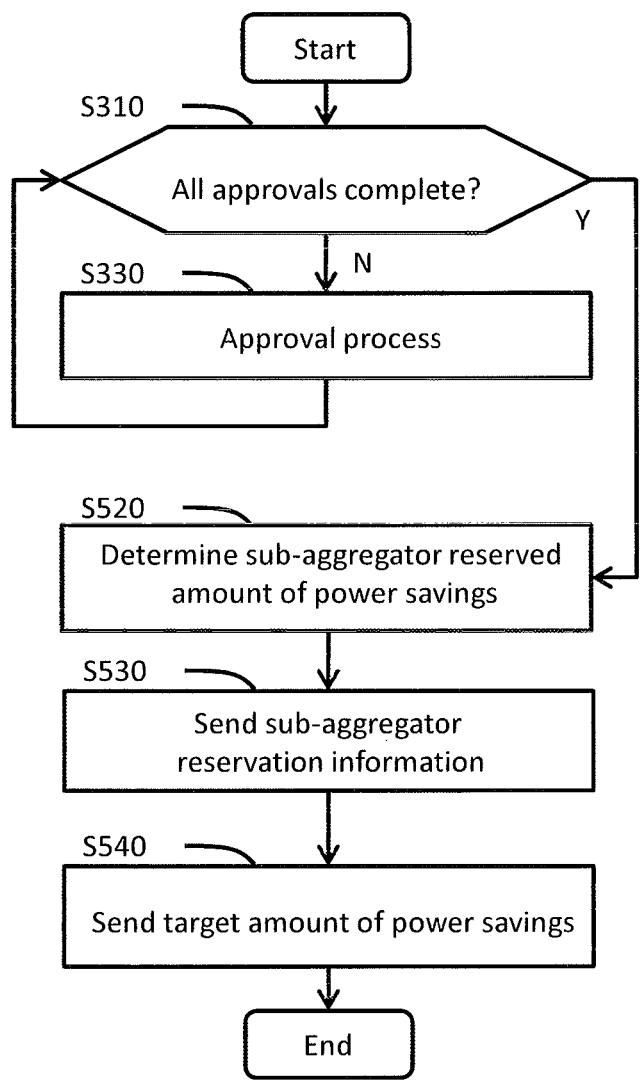
FIG. 9 shows a power-saving reservation process.

FIG. 9 shows a power-saving reservation process. First, the reservation unit 212 determines whether or not approval of the power-saving application has been completed for all the sub-aggregators (S310).

When it has been determined that approval of the power-saving application has been completed for all the sub-aggregators (S310: Y), the reservation unit 212 shifts the processing to S520.

When it has been determined that approval of the power-saving application has not been completed for all the sub-aggregators (S310: N), the reservation unit 212 selects a target sub-aggregator from among the sub-aggregators for which power-saving application approval, has not been completed. Next, the reservation unit 212 performs an approval process for approving the sub-aggregator application information from the target sub-aggregator (S330), and shifts the processing to S310.

When it has been determined in S310 that approval of the power-saving application has been completed for all the sub-aggregators, the reservation unit 212 acquires the requested amount of power savings from the power DB 280. Next, on the basis of the requested amount of power savings and the sub-aggregator application information for all the sub-aggregators, the reservation unit 212 determines the amount of power savings reserved for each sub-aggregator, and stores the amounts of power savings in the sub-aggregator DB 270 as sub-aggregator reserved amount of power savings (S520). Next, the reservation unit 212 sends sub-aggregator reservation information including the sub-aggregator reserved amount of power savings and a reserved incentive to the sub-aggregator processing apparatus 310 of each sub-aggregator (S530). At this point, the reservation unit 212 calculates the reserved incentive corresponding to the sub-aggregator reserved amount of power saving, and performs a reserved incentive payment process.

Next, the reservation unit 212 regards the total of all the sub-aggregator reserved amount of power savings as the target amount of power saving, notifies the power company processing apparatus 110 of the target amount of power saving, stores the target amount of power savings in the power DB 280 (S540), and ends the flow. This makes it possible for the power company to ascertain the scheduled amount of power savings to be implemented by the aggregator during the power-saving time period.

The preceding is the flow of the power-saving reservation process.

In addition to this embodiment, the power-saving reservation process S220 may be such that power savings are reserved for each sub-aggregator. That is, the equal-λ-law described hereinbelow may be used with the total incentive function Fc(s) related to the sub-aggregator (where s represents the sub-aggregator) to calculate and reserve the amount of power to be saved for each sub-aggregator.

Next, the approval process indicated in S330 of the power-saving reservation process will be explained.

Figure 10:
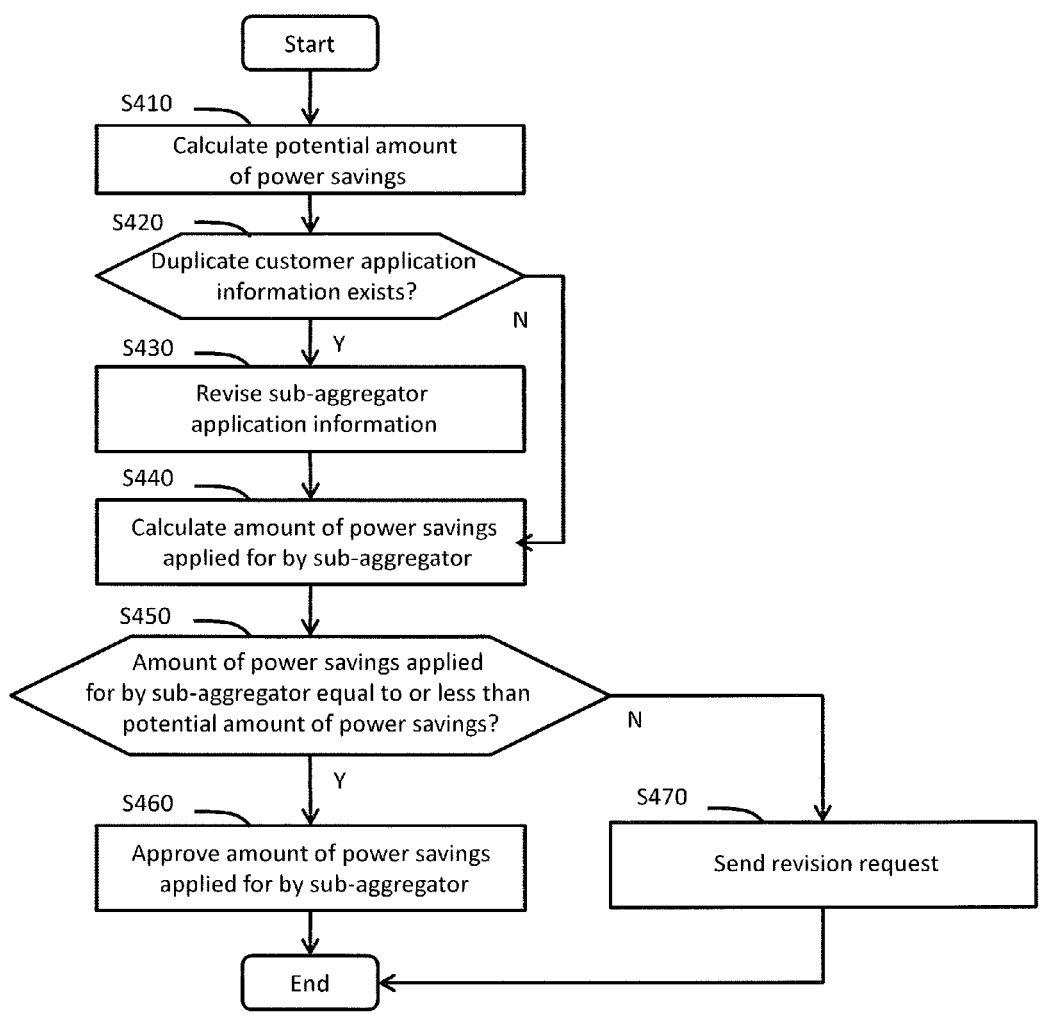
FIG. 10 shows an approval process.

FIG. 10 shows an approval process. First, the reservation unit 212 acquires the sub-aggregator facilities information and the sub-aggregator application information of the target sub-aggregator from the sub-aggregator DB 270, and from the sub-aggregator facilities information, acquires the customer facility information for all the customers belonging to the target sub-aggregator. Next, on the basis of the acquired customer facility information, the reservation unit 212 calculates a potential amount of power savings indicating the power-saving potential of the target sub-aggregator by estimating the amount of power savings capable of being implemented by the target sub-aggregator (S410).

At this point, the reservation unit 212 calculates the maximum amount of power savings capable of being implemented by the target sub-aggregator on the basis of the total floor area and contract demand in the customer facility information. Next, the reservation unit 212 calculates the potential amount of power savings by multiplying a preconfigured coefficient K by the maximum amount of power saving. The reservation unit 212 may calculate the maximum amount of power savings by using information indicating the performance of the electrical equipment, past meteorological information, and meteorological forecasts corresponding to the power-saving time period.

At this point, the reservation unit 212, for example, acquires from the sub-aggregator application information the quantity and power-saving types of all the customer electrical equipment that is subject to the sub-aggregator contract of the customer belonging to the sub-aggregator, and calculates the power usage that is subject to the sub-aggregator contract. In accordance therewith, the verification unit 213 calculates a potential dependency, which is the percentage of the customer's power usage that is subject to the sub-aggregator contract. In accordance therewith, the reservation unit 212 distributes the customer power usage to each sub-aggregator in accordance with the potential dependency, and calculates the power usage of each sub-aggregator by totaling the power usage distributed to each sub-aggregator. The reservation unit 212, for example, may calculate the maximum amount of power savings for each sub-aggregator by calculating the maximum amount of customer power savings, and totaling the maximum amount of power savings distributed to each sub-aggregator in accordance with the potential dependency.

Next, the reservation unit 212 determines whether or not there is duplicate customer application information in the acquired sub-aggregator application information (S420). At this point, the reservation unit 212, for example, determines that duplicate customer application information exists when there is customer application information having the same customer identifier and power-saving types in both a certain sub-aggregator application information and another sub-aggregator application information.

When it has been determined that duplicate customer application information exists (S420: Y), the reservation unit 212 revises the sub-aggregator application information of the target sub-aggregator by removing all but one of the duplicate customer application information (S430). At this point, the reservation unit 212, for example, may leave the customer application information that has the largest customer application power-saving amount from among the duplicate customer application information, and delete the other customer application information. Or, on the basis of the customer application power-saving amount, the power-saving type, and the power-saving unit price, the reservation unit 212, for example, may leave the customer application information for which the incentive is the smallest from among the duplicate customer application information, and delete the other customer application information.

Either after S430 or when it has been determined in S420 that duplicate customer application information does not exist (S420: N), the reservation unit 212 totals all the customer application power-saving amounts in the sub-aggregator application information, and regards this total as the sub-aggregator application power-saving amount (S440). Next, the reservation unit 212 determines whether or not the sub-aggregator application power-saving amount is equal to or less than the potential amount of power savings (S450).

When it has been determined that the sub-aggregator application power-saving amount is equal to or less than the potential amount of power savings (S450: Y), the reservation unit 212 approves the sub-aggregator application information, stores the approval in the sub-aggregator DB 270 (S460), and transitions the processing to S310.

Alternatively, when it has been determined that the sub-aggregator application power-saving amount is not equal to or less than the potential amount of power savings (S450: N), the reservation unit 212 sends a revision request to the sub-aggregator processing apparatus 310 of the target sub-aggregator in order to request that the sub-aggregator application information be revised (S470), and transitions the processing to S310.

Furthermore, when it has been determined that the sub-aggregator application power-saving amount is not equal to or less than the potential amount of power savings (S450: N), the reservation unit 212 may reject the sub-aggregator application information of the target sub-aggregator, and delete the sub-aggregator application power-saving amount of the target sub-aggregator from the sub-aggregator DB 270. In this case, the reservation unit 212 regards the sub-aggregator application information minus the sub-aggregator application power-saving amount as having been approved, and transitions the processing to S310.

The preceding is the flow of the approval process.

According to the power-saving reservation process, the aggregator can either reject or revise an application when the amount of power savings applied for exceeds the power-saving potential capable of being implemented by either the customer or the sub-aggregator. In accordance therewith, it is possible to prevent either the customer or the sub-aggregator from obtaining a reserved incentive fraudulently.

Next, the process for determining the sub-aggregator reserved amount of power savings indicated in S520 of the power-saving reservation process will be explained in detail.

The reservation unit 212, on the basis of the sub-aggregator application information of all the sub-aggregators, distributes the requested amount of power savings to the sub-aggregator reserved amount of power savings of each sub-aggregator. This distribution, for example, can make use of the law of equal incremental fuel costs (equal-λ-law).

First, the reservation unit 212 calculates an amount of electrical equipment reserved power saving, which is the amount of power savings reserved for the electrical equipment that is subject to the sub-aggregator. When the electrical equipment quantity is regarded as i, the power-saving unit price of the electrical equipment is regarded as Fc(i), and the electrical equipment reserved power-saving of the electrical equipment is regarded as W(i), λ_i is expressed using the following equation.

$$\lambda\_i = dFc(i)/dW(i) \tag{Ea}$$

In addition, when a set of a quantity of electrical equipment for which power savings is reserved is regarded as I, λ_i and λ_j satisfy the following equation for an optional i and j included in the I.

$$\lambda\_i = \lambda\_j \tag{Eb}$$

In addition, when the requested amount of power savings is regarded as P, the sum total ΣW(i) of W(i) for all i included in I satisfies the following equation.

$$P = \Sigma W(i) \tag{Ec}$$

Thus, by using the law of equal incremental fuel costs, it is possible to economically distribute the power-saving reserved for the electrical equipment that is subject to the sub-aggregator.

Next, the reservation unit 212 totals the amounts of electrical equipment reserved power savings of all the electrical equipment that is subject to a single sub-aggregator for each sub-aggregator, and regards this total as the sub-aggregator reserved amount of power savings of the sub-aggregator. At this point, the reservation unit 212 may limit the amount of electrical equipment reserved power savings pertaining to the sub-aggregator such that the sub-aggregator reserved amount of power savings is equal to or less than the sup-aggregator application power-saving amount of the sub-aggregator.

The reservation unit 212 may use a probability of the sub-aggregator implementing power savings to calculate a potential amount of power saving. This probability is determined by a contract between the aggregator and the sub-aggregator, and indicates the feasibility of power savings being implemented by the sub-aggregator. In this case, the smaller the probability, the smaller the potential amount of power saving. Whether to use probability or not may be determined at the time of the contract.

In S520, the reservation unit 212 may regard the approved sub-aggregator application power-saving amount as the sub-aggregator reserved amount of power saving.

Next, the operations of the sub-aggregator processing apparatus 310 during the power-saving time period will be explained.

During the power-saving time period, the sub-aggregator processing apparatus 310, on the basis of sub-aggregator reservation information from the aggregator processing apparatus 210, creates BC instruction information indicating an instruction to the BCs 410a and 410b of the customer that is a partner to the contract, and sends this instruction information to the BCs 410a and 410b. The BC instruction information is for controlling the electrical equipment 430a and 430b. The BC instruction information, for example, is for controlling the power consumption of the electrical equipment 430a and 430b using a command for controlling ON/OFF at certain times, a command for controlling the temperature setting of air-conditioning equipment, a command for controlling the brightness of lighting equipment, and so forth.

During the power-saving time period, the sub-aggregator processing apparatus 310 acquires the operation logs in the operation DBs 440*a*, 440*b*, and 440*c* of the customer that is a partner to the contract, and sends the logs to the aggregator processing apparatus 210. The verification unit 213 stores the operation logs from the sub-aggregator processing apparatus 310 in the sub-aggregator DB 270.

Next, the power-saving verification process indicated in S230 will be explained.

Figure 11:
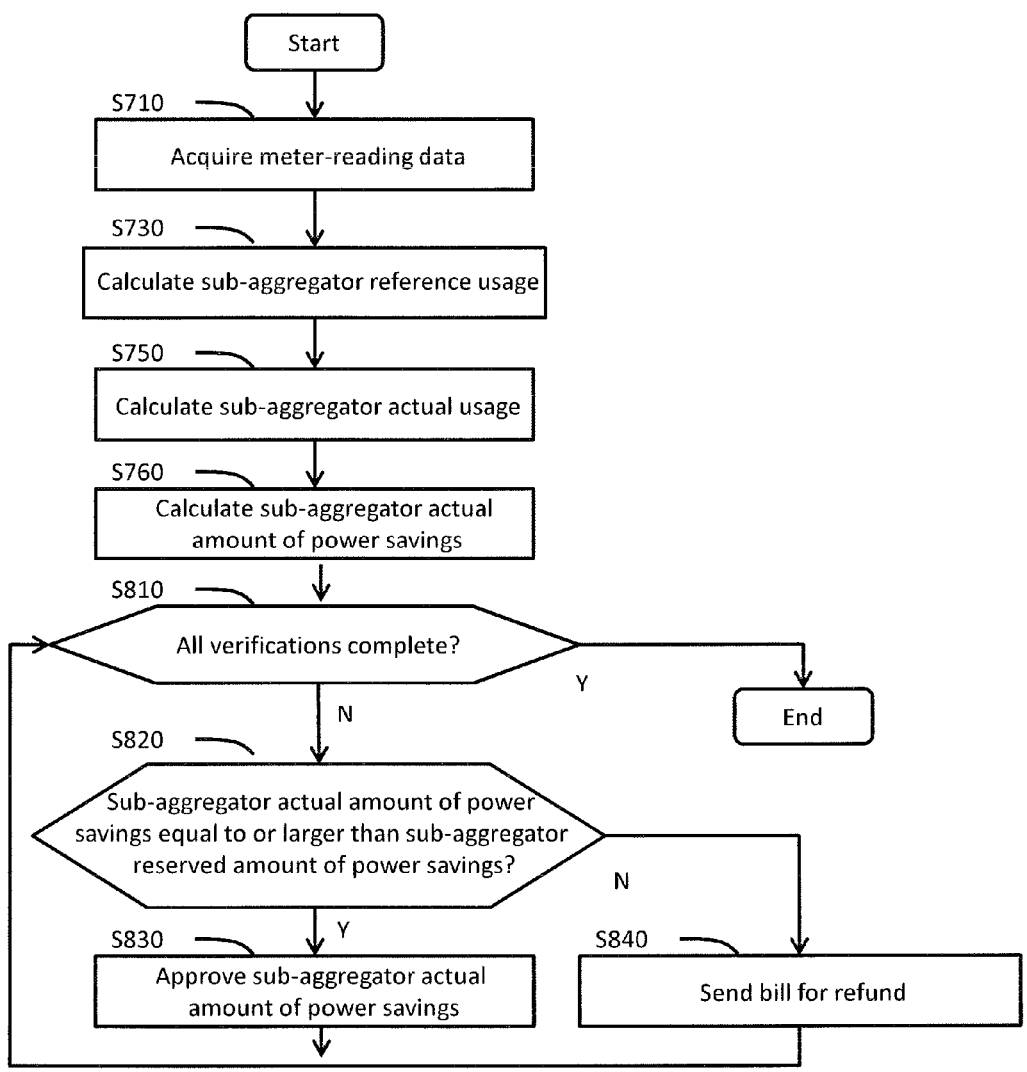
FIG. 11 shows a power-saving verification process.

FIG. 11 shows a power-saving verification process. First, the verification unit 213 acquires meter-reading data from the power company processing apparatus 110, and stores this data in the meter-reading DB 260 (S710).

Next, the verification unit 213 acquires the sub-aggregator facilities information and the sub-aggregator reservation information of all the sub-aggregators from the sub-aggregator DB 270. Next, on the basis of the sub-aggregator facilities information and the sub-aggregator reservation information, the verification unit 213 calculates the power usage of each sub-aggregator at a reference time, and regards this power usage as the sub-aggregator reference usage (S730).

In S730, the verification unit 213 may, on the basis of the sub-aggregator facilities information and the sub-aggregator reservation information, calculate the power usage of each piece of electrical equipment by performing a physical simulation of the electrical equipment that is subject to the sub-aggregator, and calculate the sub-aggregator reference usage from the power usages. Also, the verification unit 213 may acquire from the sub-aggregator facilities information the contract demand of all the customers belonging to the sub-aggregator, and may calculate the sub-aggregator reference usage from the contract demand. The verification unit 213 may acquire from the meter-reading DB 260 a peak power usage for a prescribed period included in the reference time for all the customers belonging to a certain sub-aggregator, and may calculate the sub-aggregator reference usage from the peak power usages. The verification unit 213 may acquire from the meter-reading DB 260 an average power usage for a prescribed period included in the reference time for all the customers belonging to a certain sub-aggregator, and may calculate the sub-aggregator reference usage from the average power usages.

The verification unit 213, on the basis of either one of the sub-aggregator facilities information and the sub-aggregator reservation information, calculates the percentage of customer power usage that is subject to a contract with a certain sub-aggregator. At this time, for example, the verification unit 213 acquires the quantity and power-saving types of all the electrical equipment subject to the contract with this sub-aggregator, and calculates the power usage that is subject to the contract with this sub-aggregator. In accordance therewith, the verification unit 213 calculates a reference dependency, which is the percentage of the customer power usage that is subject to the contract with this sub-aggregator.

Next, in accordance with this reference dependency, the verification unit 213 calculates the sub-aggregator reference usage of each sub-aggregator by distributing the customer power usage at the reference time to the respective sub-aggregators and totaling the power usage distributed to each of the sub-aggregators.

Also, the reference time, for example, is the time at which a tight power supply situation occurred in the past under the same condition as at the tight-power time. The reference time and the tight-power time may be times of the same period the previous year at which, for example, the type indicative of a season, a weekday, or a holiday is the same. The reference time may be the peak power usage time of the previous year.

Next, the verification unit 213 acquires an operation log from the sub-aggregator DB 270, and acquires from the meter-reading DB 260 the meter-reading data of all the customers belonging to all the sub-aggregators at verification time. Next, the verification unit 213 calculates the power usage of each sub-aggregator at the verification time on the basis of the meter-reading data and the operation log, and regards this power usage as a sub-aggregator actual usage (S750).

As used here, for example, the verification time is the tight-power time. The verification unit 213 may also acquire from the power company processing apparatus 110 the time during the power-saving time period at which the difference between the aggregate supply (refers to the potential aggregate supply by a power generator in the operating state) and the aggregate demand is actually the smallest, and may regard this time as the verification time. The verification unit 213 may also calculate changes in sub-aggregator power usage times during the power-saving period, detect the time within the changes in time at which the power usage was the highest, and regard this time as the verification time.

In S750, the verification unit 213, on the basis of the sub-aggregator reservation information and operation log, calculates the percentage of meter-reading data power usage that is subject to the contract with a certain sub-aggregator for each customer. At this point, for example, the verification unit 213 acquires the quantity and power-saving types of all the electrical equipment that is subject to the sub-aggregator contract of the electrical equipment of the customer belonging to the sub-aggregator, and calculates the power usage subject to the sub-aggregator contract. In accordance therewith, the verification unit 213 calculates an actual dependency, which is the percentage of the customer's power usage that is subject to the sub-aggregator contract. In accordance therewith, the verification unit 213 calculates a sub-aggregator actual usage for each sub-aggregator by distributing the customer power usage to the respective sub-aggregators in accordance with the actual dependency and totaling the power usage distributed to each of the sub-aggregators.

Next, the verification unit 213 calculates a sub-aggregator actual amount of power savings by subtracting the sub-aggregator actual usage from the sub-aggregator reference usage (S760).

Next, the verification unit 213 determines whether or not verification of power savings has been completed for all the sub-aggregators (S810).

When it is determined that the verification of power savings has been completed for all the sub-aggregators (S810: Y), the verification unit 213 ends this flow.

When it is determined that the verification of power savings has not been completed for all the sub-aggregators (S810: N), the verification unit 213 selects a target sub-aggregator from among the sub-aggregators for which verification of power savings has not been completed. Next, the verification unit 213 determines whether or not the sub-aggregator actual amount of power savings is equal to or larger than the sub-aggregator reserved amount of power savings by comparing the sub-aggregator reserved amount of power savings of the target sub-aggregator to the sub-aggregator actual amount of power savings of the target sub-aggregator (S820).

When it has been determined that the sub-aggregator actual amount of power savings is equal to or larger than the sub-aggregator reserved amount of power savings (S820: Y), the verification unit 213 approves this sub-aggregator actual amount of power saving, stores the approval in the sub-aggregator DB 270 (S830), and transitions the processing to S810.

Alternatively, when it has been determined that the sub-aggregator actual amount of power savings is not equal to or larger than the sub-aggregator reserved amount of power savings (S820: N), the verification unit 213 recognizes that the target sub-aggregator has not executed the reservation, calculates a reserved incentive refund on the basis of the difference between the sub-aggregator reserved amount of power savings and the sub-aggregator actual amount of power saving, sends the target sub-aggregator information indicating a bill for the refund (S840), and transitions the processing to S810.

The preceding is the flow of the power-saving verification process.

According to the power-saving verification process, it is possible to calculate the results of power savings pertaining to each sub-aggregator. This makes it possible to verify the validity of the reserved incentive for each sub-aggregator. Therefore, a sub-aggregator can be prevented from obtaining a fraudulent reserved incentive.

Furthermore, when a customer system 400 includes a plurality of electrical equipment that is subject to a plurality of sub-aggregators, respectively, the power usage of electrical equipment subject to a certain sub-aggregator may increase even though the power usage of electrical equipment subject to another sub-aggregator decreases. For example, the power usage of air-conditioning equipment that is subject to a certain sub-aggregator may increase in a room as a result of the power usage of air-conditioning equipment that is subject to another sub-aggregator being decreased and the temperature inside the room rising. Even in a case such as this, it is possible to distribute the customer's power usage among the plurality of sub-aggregators and calculate the results of the power savings by each sub-aggregator.

The aggregator processing apparatus 210, instead of calculating a reserved incentive on the basis of the sub-aggregator reserved amount of power savings calculated using the power-saving reservation process to process a payment to a sub-aggregator, may calculate an actual incentive on the basis of the sub-aggregator actual amount of power savings calculated using the power-saving verification process to process a payment to a sub-aggregator. In this case, the aggregator processing apparatus 210, for example, may regard the power-saving result of each sub-aggregator as an activity, and use activity-based costing (ABC) to distribute (prorate) actual incentives to Sa and Sb.

It is impossible to calculate the amount of power savings implementable by each sub-aggregator and the actual amount of power savings by each sub-aggregator using only the metering data of each customer. In accordance therewith, it is impossible to appropriately determine the incentive of each sub-aggregator relative to the power savings. Alternatively, according to this example, it is possible to calculate the amount of power savings implementable by each sub-aggregator and/or the actual amount of power savings by each sub-aggregator.

The customer system 400 may include power supply equipment such as a power generator and/or a secondary battery. In this case, it is possible to adjust the power demand by controlling the power supply equipment in accordance with instructions from the aggregator processing apparatus 210 and the sub-aggregator processing apparatus 310. The amount of power savings in this case is a power-demand-adjusted amount, and is the total, of the decrease in the amount of power demand resulting from power savings, and the increase in the amount of the power supply resulting from the power supply equipment.

The aggregator processing apparatus 210 may perform a power-saving reservation process immediately prior to the power-saving time period, such as on the morning of the day of the power-saving time period. The aggregator processing apparatus 210 may perform the power-saving reservation process during the power-saving time period upon receiving an emergency power-saving request from the power company processing apparatus 110. The aggregator processing apparatus 210 may perform the power-saving verification process immediately after the power-saving time period, or may perform the power-saving verification process at the end of the month of the power-saving time period. The conditions for these times and incentive payments may be stipulated in the contract.

The customer system 400 may be a residence. The BCs 410a and 410b, and the customer terminal apparatus 420 may be an energy management system (EMS) such as a building energy management system or a home energy management system (HEMS), or may be a power conditioning system (PCS). The meter 450 may be a smart meter, such as an advanced metering infrastructure (AMI).

The meter 450 may send the metering data via a metering communications network to a meter data management system (MDMS). In this case, the aggregator processing apparatus 210 acquires the metering data from the MDMS.

At least a part of the configuration of the present invention can be realized as either a computer program or a hardware circuit. The computer program, for example, can be delivered via a communications medium such as the internet, or via a recording medium such as a hard disk or flash memory device. For example, each of the power company processing apparatus 110, the aggregator processing apparatus 210, the sub-aggregator processing apparatus 310, and the BCs 410a and 410b may be a computer including a microprocessor, a memory, and a communications interface. In this case, the microprocessor realizes the functions of each apparatus in accordance with programs stored in the memory.

One aspect of the present invention, for example, can also be realized as a computer program as follows:

"A computer program for adjusting, in accordance with a power demand adjustment apparatus, the power demand of a customer that has concluded a power use contract via an agent, the computer-executed computer program: acquiring facilities information indicating the above-mentioned customer facility for power use, and result information indicating the results of the above-mentioned customer's power use; and calculating, on the basis of the above-mentioned acquired facility information and the above-mentioned acquired result information, an actual adjustment amount, which is the result of power demand adjustment pertaining to the agent."

A power demand adjustment system and a power demand adjustment apparatus of the present invention, for example, correspond to the aggregator processing apparatus 210. An agent in the present invention, for example, corresponds to the sub-aggregator. An acquisition unit, for example, corresponds to the communication unit 211 in the examples. A calculation unit of the present invention, for example, corresponds to the verification unit 213. A determination unit of the present invention, for example, corresponds to the reservation unit 212.

Facility information of the present invention, for example, corresponds to the customer facility information. Result information of the present invention, for example, corresponds to the metering data. An actual adjustment amount of the present invention, for example, corresponds to the sub-aggregator actual amount of power saving. A scheduled adjustment amount of the present invention, for example, corresponds to the sub-aggregator reserved amount of power saving. An application adjustment amount of the present invention, for example, corresponds to the amount of power savings applied for by the sub-aggregator. An adjustment amount upper limit of the present invention, for example, corresponds to the potential amount of power saving. Information indicating the size of the power demand by the customer in the present invention, for example, corresponds to the contract demand. Information indicating the size of the customer facility of the present invention, for example, corresponds to the total floor area. Type information of the present invention, for example, corresponds to the power-saving type.

The present invention is not limited to the examples described hereinabove. A person having ordinary skill in the art will be able to make various additions or changes without departing from the scope of the present invention.

REFERENCE SIGNS LIST

100 Power company system
110 Power company processing apparatus
200 Aggregator system
210 Aggregator processing apparatus
211 Communication unit
212 Reservation unit
213 Verification unit
260 Meter-reading DB (Database)
270 Sub-aggregator DB
280 Power DB
300 Sub-aggregator system
310 Sub-aggregator processing apparatus
360 Customer DB
400 Customer system
410 BC (Building Controller)
420 Customer terminal apparatus
430a, 430b, 430c Electrical equipment
440a, 440b, 440c Operation DB
450 Meter

The invention claimed is:

1. A power demand adjustment system comprising:
an aggregator system, wherein the aggregator system includes:
an aggregator memory that stores a meter reading database, a sub-aggregator database and a power database,
an aggregator communication interface that is communicatively coupled to a power company system and a plurality of sub-aggregator systems, and
an aggregator processor that is communicatively coupled to the aggregator memory and the aggregator communication interface; and
wherein the aggregator processor:
receives, using the aggregator communication interface, meter reading data from the power company system, wherein the meter reading data includes an amount of power consumed by electrical equipment as measured by an electric meter, wherein the electrical equipment and the electric meter are included in each of a plurality of customer systems,
acquires, using the aggregator communication interface, aggregated facility information from the plurality of sub-aggregator systems,
calculates a reference power usage of each sub-aggregator system from the plurality of sub-aggregator systems at a reference time based on the aggregated facility information acquired from the plurality of sub-aggregator systems, wherein the reference time is a time at which a peak power usage of the customer systems occurs during a prescribed time period,
calculates a reference dependency which is an amount of reference power usage contracted between each customer and sub-aggregator system,
distributes the reference power usage at the reference time to the respective sub-aggregator systems according to the reference dependency,
calculates an actual power usage of each sub-aggregator system from the plurality of sub-aggregator systems at a verification time based on the meter reading data received from the power company system, wherein the verification time is a time at which the difference between an aggregate power supply and demand of the customer systems is the smallest,
calculates an actual dependency which is an amount of actual power usage contracted between each customer and sub-aggregator system,
distributes the actual power usage at the verification time to the respective sub-aggregator systems according to the actual dependency,
calculates an actual power savings of each sub-aggregator system by subtracting the actual power usage from the reference power usage of each sub-aggregator system, and
controls the amount of power consumed by the electrical equipment included in the customer systems based on the calculated actual power savings of each sub-aggregator system.

2. The power demand adjustment system according to claim 1, wherein the aggregator processor further:
calculates an actual power adjustment amount for each of the plurality of customer systems based on the aggregated facility information and a type of power demand adjustment by each of the customer systems.

3. The power demand adjustment system according to claim 2, wherein the aggregator processor further:
sends incentive information to each customer system, wherein the incentive information indicates an incentive for each type of power demand adjustment.

4. The power demand adjustment system according to claim 3, wherein the aggregated facility information includes information indicating a magnitude of the power demand by the customer systems.

5. The power demand adjustment system according to claim 4, wherein the aggregated facility information includes information indicating one or more of an inside volume of an indoor space of a customer system, a total floor area of the customer system, a quantity and type of electrical equipment included within the customer system, and a performance and efficiency of the electrical equipment.

6. A power demand adjustment method for adjusting power demand, the power demand adjustment method comprising:
receiving, by a plurality of sub-aggregators, aggregated facility information from each of a plurality of customer systems coupled to a particular sub-aggregator, wherein the aggregated facility information identifies a total floor area of the plurality of customer systems communicatively coupled to the particular sub-aggregator;

transmitting, by the plurality of sub-aggregators, the aggregated facility information to an aggregator, wherein the aggregator includes:
- an aggregator memory that stores a meter reading database, a sub-aggregator database and a power database,
- an aggregator communication interface that is communicatively coupled to a power company system and the plurality of sub-aggregators, and
- an aggregator processor that is communicatively coupled to the aggregator memory and the aggregator communication interface;

receiving, by the aggregator, meter reading data from the power company system, wherein the meter reading data includes an amount of power consumed by electrical equipment as measured by an electric meter, wherein the electrical equipment and the electric meter are included in each of the plurality of customer systems;

acquiring, by the aggregator, the aggregated facility information from the plurality of sub-aggregators;

calculating, by the aggregator, a reference power usage of each sub-aggregator from the plurality of sub-aggregators at a reference time based on the aggregated facility information acquired from the plurality of sub-aggregators, wherein the reference time is a time at which a peak power usage of the customer systems occurs during a prescribed time period, calculating, by the aggregator, a reference dependency which is an amount of reference power usage contracted between each customer and sub-aggregator system, distributing, by the aggregator, the reference power usage at the reference time to the respective sub-aggregators according to the reference dependency, calculating, by the aggregator, an actual power usage of each sub-aggregator from the plurality of sub-aggregators at a verification time based on the meter reading data received from the power company system, wherein the verification time is a time at which the difference between an aggregate power supply and demand of the customer systems is the smallest, calculating, by the aggregator, an actual dependency which is an amount of actual power usage contracted between each customer and sub-aggregator system, distributing, by the aggregator, the actual power usage at the verification time to the respective sub-aggregators according to the actual dependency, calculating, by the aggregator, an actual power savings of each sub-aggregator by subtracting the actual power usage from the reference power usage of each sub-aggregator, and controlling, by the aggregator, the amount of power consumed by the electrical equipment included in the customer systems based on the calculated actual power savings of each sub-aggregator.

\* \* \* \* \*